United States Patent [19]
Nakai et al.

[11] Patent Number: 5,699,454
[45] Date of Patent: Dec. 16, 1997

[54] IMAGE PROCESSING APPARATUS

[75] Inventors: Yoshiyuki Nakai; Youichi Yamamoto, both of Nara; Keiji Taniguchi, Fukui, all of Japan

[73] Assignee: Sharp Kabushiki Kaisha, Osaka, Japan

[21] Appl. No.: 433,227

[22] Filed: May 2, 1995

[30] Foreign Application Priority Data

May 9, 1994 [JP] Japan ................... 6-094921

[51] Int. Cl.$^6$ ............................................. G06K 9/38
[52] U.S. Cl. ..................... 382/172; 382/270; 358/464; 358/465
[58] Field of Search ........................... 382/172, 171, 382/271, 168, 252, 270, 274, 288, 275; 358/463, 464, 465, 466

[56] References Cited

U.S. PATENT DOCUMENTS

| | | | |
|---|---|---|---|
| 5,138,671 | 8/1992 | Yokoyama | 382/52 |
| 5,157,740 | 10/1992 | Klein et al. | 382/51 |
| 5,351,313 | 9/1994 | Bessho et al. | 382/51 |
| 5,400,415 | 3/1995 | Kobayashi | 382/51 |

FOREIGN PATENT DOCUMENTS 59-197032  11/1984  Japan .
1-55796    11/1989  Japan .

*Primary Examiner*—Edward L. Coles, Sr.
*Assistant Examiner*—Stephen Brinich
*Attorney, Agent, or Firm*—David G. Conlin; Brian L. Michaelis

[57] ABSTRACT

An image processing apparatus includes a detecting section for detecting a density value as a threshold value for suppressing an effect from a background from image data composed of plural picture element data obtained by digitizing each picture element of the image and a density converting section for outputting the image data after converting density values of the picture element data whose density values are below the threshold value into a predetermined value indicating white when the density value of the picture element data is below the threshold value. The detecting section computes a degree of separation indicating a ratio of a between-class dispersion to a within-class dispersion of two classes divided by the threshold value by sequentially varying the density value. Then, the density value corresponding to a gravitational center of a differential histogram showing the respective differences in degree of separation from a density Tm which maximizes the degree of separation to a highest density Te. The apparatus enables an effective threshold value to be set even with respect to the image data wherein a difference in density level between the background and the image is not significant, thereby enabling the removal of the background from such image data.

8 Claims, 8 Drawing Sheets

IMAGE PROCESSING APPARATUS

FIELD OF THE INVENTION

The present invention relates to an image processing apparatus which permits an improved signal quality of an image by digital image processing, especially in background processing.

BACKGROUND OF THE INVENTION

Many researches have been made on methods of computing a threshold value for digitization and for removing background in image processing apparatuses such as facsimiles machines, electrophotographic printing machines, digital copying machines, etc. As the method of computing such threshold value, the method based on the density histogram is known.

The known methods based on the density histogram includes the P-tile method, the mode method and the discriminating threshold value selection method. The density histogram is a graph in which the horizontal axis indicates the density of each picture element, and the vertical axis indicates a number of picture elements having each density (frequency).

As shown in FIG. 6, in the P-tile method, the density value which gives the cumulative distribution of P% (for example 90%) is computed from the lowest density in the density histogram as the threshold value. In the P-tile method, the picture element having the density value of not more than the threshold value is considered as the background B, while the picture element having the density value of not less than the threshold value is considered as the object O as an image. The described P-tile method is effective in the case where the ratio of the frequency corresponding to the object O in the image data is known.

In the mode method, for example, as shown in FIG. 7, on the assumption that the density histogram shows a bimodal distribution, the density at the trough in the density histogram is detected as the threshold value. In the mode method, the picture element having the density value of not more than the threshold value is determined as the background B, and the picture element having the density value of not less than the threshold value is determined as the object O (image). The mode method is based on the most intuitive idea as being relied on the eyesight of a human being. The mode method is generally used and is effective in the case where the density of the background and the density of characters, etc., are clearly distinctive such as newspapers, etc.

As shown in FIG. 8, in the described discriminating threshold value selecting method, the threshold value is computed using the standard of the discrimination analysis for maximizing the degree of class separation, and in order to determine the appropriateness of the threshold value for digitization, the degree of class separation $\eta(T)$ is used.

$$\eta(T) = [\delta_B^2(T)/\delta_W^2(T)]$$

($\delta_B^2(T)$: between-class dispersion; $\delta_W^2(T)$: within-class dispersion)

Then, the threshold value Tm which maximizes the degree of class separation $\eta(T)$ is computed. It can be interpreted such that the degree of class separation $\eta(Tm)$ with respect to the resulting threshold value Tm suggests the degree of binarization. The method has features such that it functions as the mode method when the density histogram shows a bimodal distribution, and even if the density histogram does not shows bimodal distribution, the threshold value would be set automatically.

The previously described P-tile method is effective when the portion of the object in the image is known; however, the method is not effective when the portion of the object is not known. In the case shown in FIG. 6, it is known that the image having a density accumulated from the brightest density of not more than 90% is the portion to be removed, the threshold value can be computed. However, if the ratio of the portion to be removed is not known, even when the density histogram of the image has the bimodal distribution as shown in FIG. 7, the effective threshold value would not be computed. FIG. 9 shows an example of computing an inappropriate threshold value using the case where the accumulated distribution P% is 90% as shown in FIG. 6.

The P-tile method is effective for a specific document in which the cumulative distribution is known beforehand. However, in the case where the cumulative distribution is not known, it is likely that the background may not be removed from the document.

In the described mode method, the threshold value cannot be computed with respect to the image in which the density histogram does not show the bimodal distribution. Namely, in the case where the density histogram is not smooth, or the density distribution does not have an outstanding trough, the threshold value may not be computed automatically.

As shown in FIG. 10, in the discriminating threshold value selecting method, the threshold value for removing the background can not be computed in the case where the difference in density level between the object and the background is not significant, or the high density portion and the low density portion are mixed within one object. The discriminating threshold value selecting method is effective only to specific documents, and for some documents, the background may not be removed.

In order to avoid conventional problems, Japanese Examined Patent Publication No. 55796/1989 (Tokukohei 1-55796) computes run lengths of the same image density, and only the run lengths greater than the threshold value are mutually added. Then, the removing operation of the background is performed based on the idea that the maximum sum indicates the background.

In order to avoid the problem associated with the conventional method, Japanese Laid-Open Patent Publication No. 197032/1984 (Tokukaisho 59-197032) discloses the histogram in which respective frequences of the minimum value and the maximum value are sampled so as to set the threshold value for removing the background.

The method disclosed in Japanese Examined Patent Publication No. 55796/1989 (Tokukouhei 1-55796) is effective in the case where the area of the background occupies a large portion of the image data such as newspapers. However, when the method is applied to the case of generating the object having a higher frequency than the background due to the non-uniformity of the density of the background or the case where a sufficient run length of the background image cannot be achieved due to the non-uniformity of the density, the following problems are presented. The background suggests that either the threshold value cannot be computed, or even if the threshold value can be computed, when removing the background based on the threshold value, a part of the object may be removed, or a part of the background may remains as a background noise.

The method disclosed in Japanese Laid-Open Patent Publication No. 197032/1984 (Tokukaisho 59-197032) is effective in removing the background of the character/linear image. However, when the method applied to the image data on the document wherein photographs, printings, etc., having many portions of intermediate tone and the character/linear image are mixed, the problem is presented in that the threshold value cannot be computed, or even if the threshold value can be computed, when removing the background based on the threshold value, a part of the object may not be removed, or a part of the background may remain as a background noise.

SUMMARY OF THE INVENTION

An object of the present invention is to provide an image processing apparatus which enables a threshold value for effectively suppressing an effect from a background to be computed even with respect to image data wherein a ratio of an object to the background is unknown.

Another object of the present invention is to provide an image processing apparatus which permits a threshold value for effectively suppressing an effect from a background to be computed even with respect to image data in which a difference in density level between the object and the background is not significant.

A still another object of the present invention is to provide an image processing apparatus which permits a threshold value for effectively suppressing an effect from the background to be computed even with respect to image data having an object in which a high density portion and a low density portion are mixed.

Earnest researches have been made with respect to various kinds of image data to achieve the described objects of the present invention and discovered that the use of a difference in degree of separation enables the removal of the background without damaging the object nor having a remaining portion of the background in a form of noise, even when the object cannot be easily separated from the background.

An image processing apparatus of the present invention is characterized by including:

detection means for detecting a threshold value indicating a density value for suppressing an effect from a background of an image based on image data, composed of plural picture element data obtained by digitizing each picture element of the image; and density conversion means for outputting the image data obtained by converting a density value of the picture element data to a predetermined value when a density value of the picture element data is not mere than the threshold value, wherein the detection means prepares a density histogram composed of density values and frequences of respective picture elements based on the image data, the detection means divides the density histogram into two classes by a certain density value, and the detection means computes a degree of separation indicating a ratio of a between-class dispersion to a within-class dispersion in each class by alternating the density value at a predetermined density interval, and computes the threshold value based on respective differences in degree of separation at respective density values in a range from a density Tm which maximizes the degree of separation to a highest density Te.

According to the described arrangement, the density value in a vicinity of the density value which minimizes the difference in degree of separation is equivalent to the density value which shows a sudden increase in the density histogram. Therefore, by setting the density value which is slightly smaller than the density value which shows a sudden increase in the density histogram as the threshold value, the background can be distinguished from the image by the threshold value.

Therefore, in the described arrangement, the picture element data having the density value of not more than the density value used as the threshold value are converted into a predetermined value, for example, a density value indicating white, by the density conversion means, to remove the picture element data having the density value of not more than the density value used as the threshold value from the image data as the background, thereby suppressing the effect from the background of the image data.

The described arrangement offers the effect that the effect from the background can be suppressed even with respect to the image data in which an effective threshold value for suppressing the effect from the background is difficult to be set, and that the image data can be converted into image data whose image can be easily read by the density converting means based on the threshold value.

The image processing apparatus of the present invention may be arranged such that the detection means computes the density value corresponding to the gravitational center of the differential histogram indicating each differential value as the threshold value.

According to the above-mentioned arrangement, even in the case where plural minimum difference values or difference values close to the minimum difference value exist, an appropriate threshold value can be achieved from the differential histogram one to one, thereby stabilizing the detection of the threshold value.

The image processing apparatus of the present invention may be arranged such that the density converting means binaries each picture element data in the image data based on the threshold value.

According to the described arrangement, the density value corresponding to the gravitational center of the differential histogram is used as the threshold value also for the binarization of the image data by the density converting means. Therefore, an effective threshold value for reducing an effect from the background even with respect to the image data in which the ratio of the background to the image is not known, or the image data whose density histogram is not smooth, or does not have a clear trough.

As a result, the arrangement offers the effects that the binarization of the image data which enables the effect from the background even to be suppressed with respect to the image data in which an effective threshold value for reducing the effect from the background is difficult to be set, and that the image data can be converted into digital data whose image can be easily read by the density converting means based on the threshold value.

The image processing apparatus of the present invention may be arranged so as to further include:

comparison means for determining a maximum difference value and comparing the maximum difference value with a set value based on a signal from the detection means; and selection means having stored therein plural method of computing a threshold value, for selecting a method of computing the threshold value based on a signal from the comparison means indicating whether the set value is greater than the maximum difference value or smaller, wherein the detection means computes a density value corresponding to the gravitational center of the histogram in each difference value as the threshold value based on a signal from the selection means if the maximum difference value exceeds the set value, and the detection means computes a difference in density value as a threshold value when each difference value is below an average when computing respective difference in degree of separation in a range from the density Tm which maximizes the degree of separation to the highest density Te if the maximum difference value does not exceed the set value.

According to the described arrangement, the effect from the background can be suppressed as in the case of the aforementioned arrangement by setting the density value corresponding to the gravitational center of the differential histogram as the threshold value when the maximum difference value is greater than the set value.

On the other hand, when the maximum difference value becomes lower than the set value, the problems may be presented in that computation of the density value corresponding to the gravitational center becomes unstable when computing the density value as the threshold value based on the gravitational center.

In the described arrangement, the respective differences in degree of separation from the density Tm which maximizes the degree of separation to the highest density Te are computed, and the density value corresponding to the difference which becomes lower than the average difference is computed as the threshold value can be set one to one, thereby achieving a stable computation of the threshold value.

As described, the selection means selects a method of computing the threshold value by the detection means among plural methods of computing the threshold value based on a signal from the comparison means for converting the maximum difference value with the set value, thereby enabling a computation of the effective threshold value for reducing the effect from the background in the image.

Therefore, the described arrangement enables the threshold value for separating the background from the image can be more surely obtained even in the case where the difference in density level between the background and the image is not significant, or the the density in the background portion or the image portion is not uniform (density difference exits in the background portion or the image portion).

The set value can be experimentally set so as to indicate an area which is difficult to be removed by the threshold value computed based on the gravitational center of the differential histogram when the difference in density level between the background and the image is not significant as the maximum difference is smaller than the set value.

As described, since the described arrangement enables an effective threshold value to be set with respect to the image data having a large difference in density level in the background portion or the image portion, thereby achieving an effect that the image data can be converted into the image data that can be easily set.

For a fuller understanding of the nature and advantages of the invention, reference should be made to the ensuring detailed description taken in conjunction with the accompanying drawings.

DESCRIPTION OF THE EMBODIMENTS

[FIRST EMBODIMENT]

Figure 1:
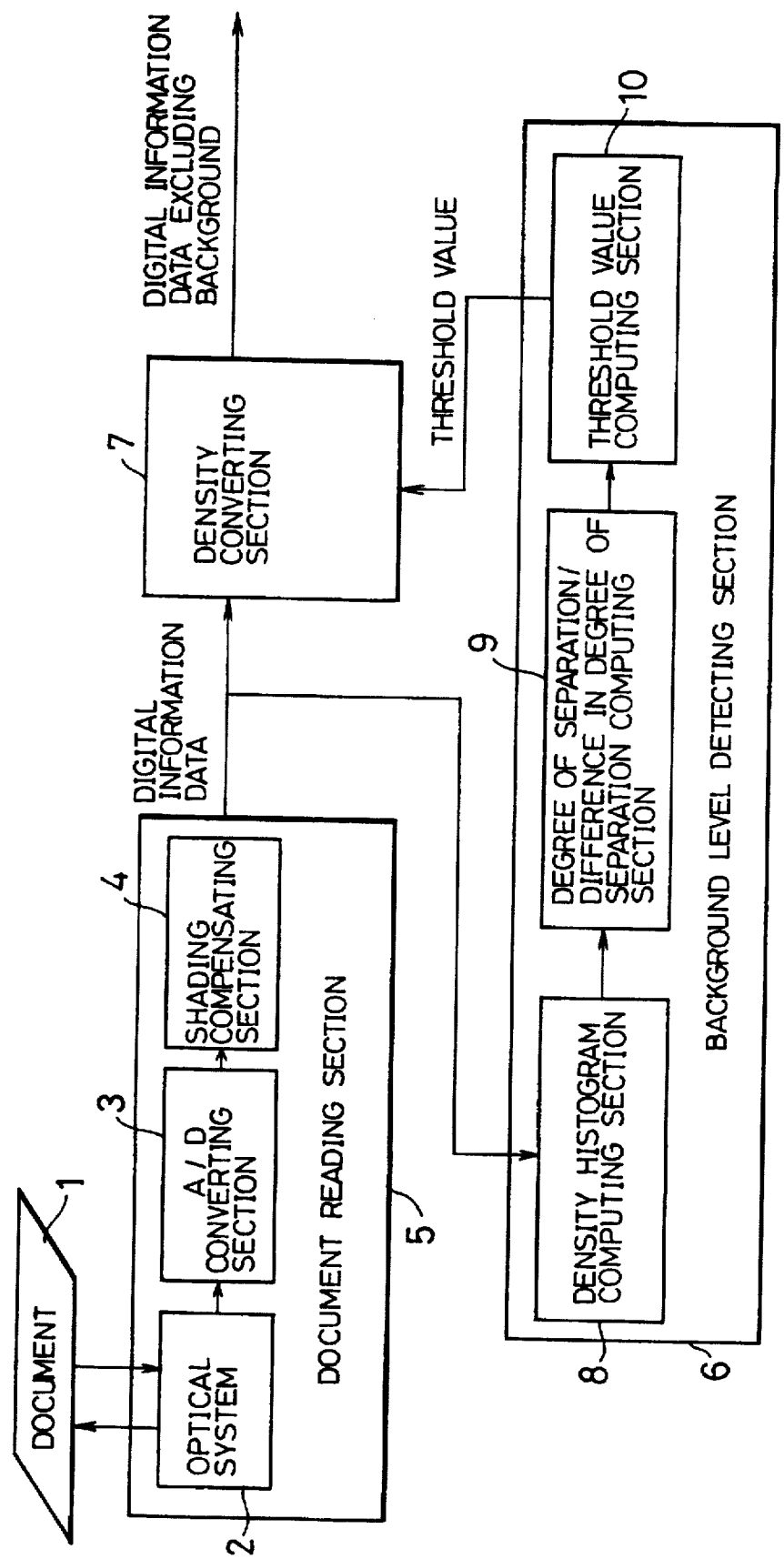
FIG. 1 is a block diagram showing a configuration of an image processing apparatus in accordance with the first embodiment of the present invention.

The following descriptions will discuss one embodiment of the present invention in reference to FIG. 1.

As shown in FIG. 1, an image processing apparatus of the present embodiment includes an optical system for projecting light on a document 1 placed on a document platen (not shown), and detecting received light reflected from the document 1 received as an image. The optical system 2 stores therein a CCD (Charge Coupled Device) line sensor section (not shown) for reading the image by receiving the reflected light. The CCD line sensor section outputs the image in a form of analog image data composed of picture element data.

The image forming apparatus includes an A/D (Analog-to-Digital) converting section 3 and a shading compensating section 4. The A/D converting section 3 samples the analog image data and converts it into a digital signal by the A/D conversion to be outputted in a form of digital image data. The shading compensating section 4 receives the digital image data from the A/D converting section 3 and compensates variations in the digital image data occurred due to the variations in the optical system 2, etc. The document reading section 5 is constituted by the described optical system 2, the A/D converting section 3 and the shading compensating section 4.

The image processing apparatus includes a background level detecting section 6 (detection means). The digital image data processed in the document reading section 5 is outputted to the background level detecting section 6. The background level detecting section 6 computes the background level as a threshold value based on the received digital image data. The background level is read in eliminating the effects from variations in the background by converting each image data that is brighter than the predetermined threshold value to the brightest value indicating white set beforehand.

The image processing apparatus includes a density converting section 7 for receiving the background level from the background level detecting section 6 and the digital image data from the document reading section 5. In the density converting section 7, all picture element data of the digital image data, which are brighter than the background level, are converted into white picture elements that show the brightest value, and outputs the picture element data below the background level without being converted.

The background level detecting section 6 includes a density histogram computing section 8 for computing a density histogram based on each picture element data in the digital image data. In the density histogram, the density of each picture data is standardized between 0 which shows the brightest value and 1 which shows the darkest value, and is prepared based on density value and the frequency of each picture element data.

The background level detecting section 6 includes a degree of separation/difference in degree of separation computing section 9 and a threshold value computing section 10. The degree of separation/difference in degree of separation computing section 9 computes the degree of separation $\eta(T)$ and a differential value $\Delta\eta(T)$ of the degree of separation based on data in density histogram. The threshold value computing section 10 computes a threshold value based on the difference in degree of separation from the degree of separation/difference in degree of separation computing section 9 to be outputted to the density converting section 7.

The background level detecting section 6 computes the background level as a threshold value based on the degree of separation $\eta(T)$ and the difference in the degree of separation $\Delta\eta(T)$. The degree of separation $\eta(T)$ is a standard for separating each density value T into two classes, and shows the degree of separation of the classes separated by the threshold value. In other words, the degree of separation indicates the class separating degree of the threshold value in the case where the density value T is used as a threshold value for separating the background from the image (object). The degree of separation $\eta(T)$ is shown by:

$$\eta(T) = \{\delta_B^2(T)/\delta_W^2(T)\} \quad (1)$$

In formula (1), $\delta_B^2(T)$ is a between-class dispersion showing a degree of separation between the classes, and $\delta_W^2(T)$ is a within-class dispersion which shows a degree of unity in each class. The $\delta_B^2(T)$ and $\delta_W^2(T)$ are respectively represented by the following formulae.

$$\delta_B^2(T) = \sum_{k \in Nn}^{n} (X_k - X)^2 / \sum_{k \in Nn}^{n_k} \ldots Nn = (1,2,\ldots,N) \quad (2)$$

$$\delta_W^2(T) = \sum_{k \in Nn} \sum_{k \in N_1}^{n} (X_k^1 - X_k)^2 / \sum_{k \in Nn}^{n_k} \ldots N_1 = (1,2,\ldots,n_k) \quad (3)$$

In formulae (2) and (3), N is a total number of sets, $n_k$ is $k^{th}$ original numbers in the $k^{th}$ set, $x_k$ is an average value of the set k, $X_{k_1}$ is the first original value in the set k, and x is an average value of all the values in the set.

Based on the sequentially computed degree of separation $\eta(T)$, the difference in degree of separation $\Delta\eta(T)$ shown by the formula (4) is computed by sequentially decrementing a density value from the density Tm indicating the maximum degree of separation to the highest density Te ($\eta(T)$ in the highest density is zero).

$$\Delta\eta(T) = \eta(T+1) - \eta(T) \quad (4)$$

The background level to be used as a threshold value is computed based on the degree of separation $\eta(T)$ and the difference in degree of separation $\Delta\eta(T)$. In the described first embodiment, the differential histogram is computed based on each difference in degree of separation $\Delta\eta(T)$ and each density value, and the density value T indicating the gravitational center of the differential histogram is set as a threshold value for removing the background.

A point at which the minimum difference in degree of separation is shown is identical with a point at which the density histogram rapidly increases, and by setting the point as the threshold value, the removal of the background can be effectively carried out. Namely, since the density value T is substantially identical with a point at which a density histogram suddenly increases, by setting the density value T as the threshold value for removing the background, the background can be effectively removed using the described effective threshold value even in the case where the difference in density level between the background and the object is not significant or in the case where the density difference exists within the background or within the object.

[SECOND EMBODIMENT]

Figure 2:
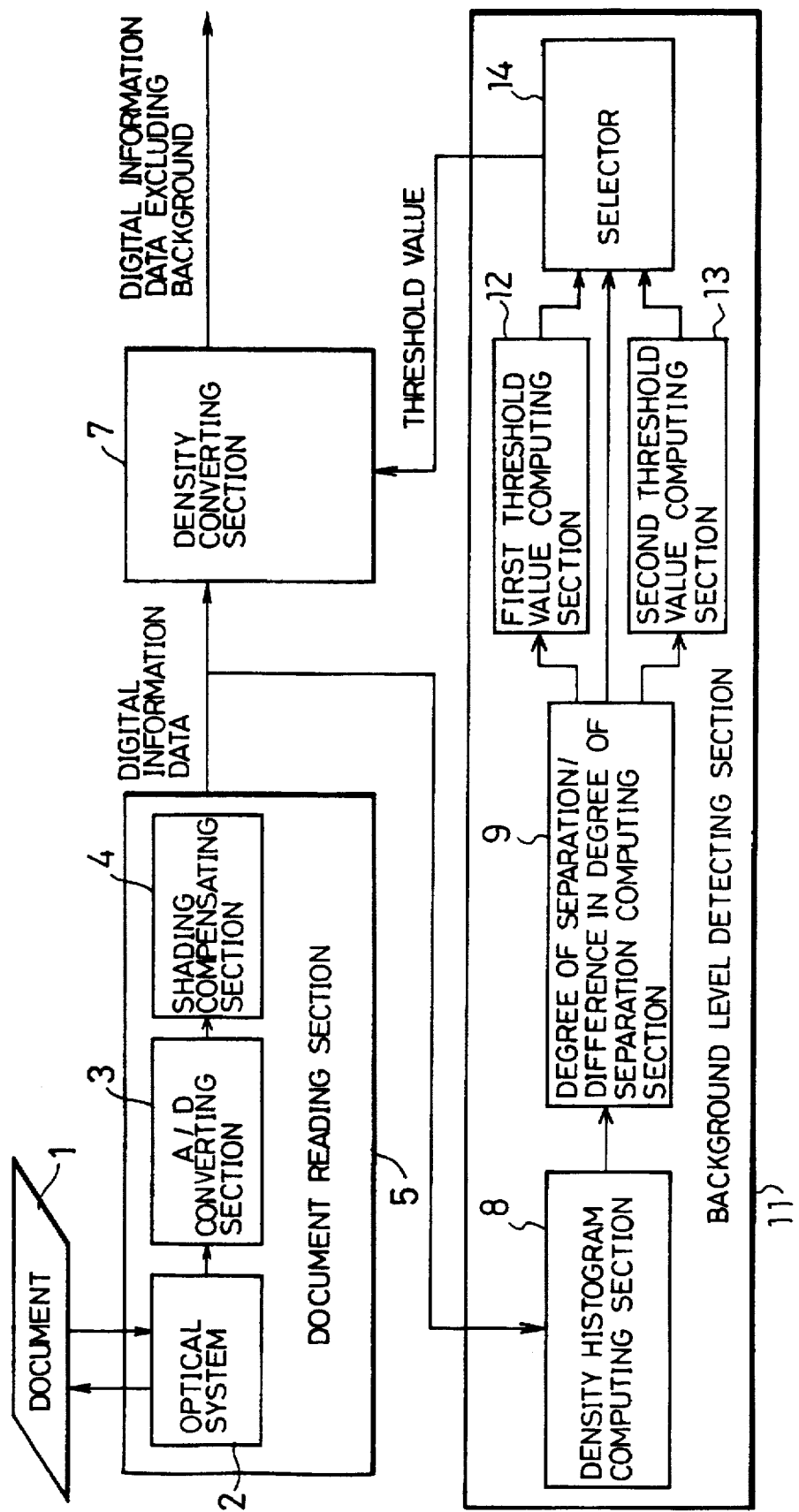
FIG. 2 is a block diagram showing a configuration of an image processing apparatus in accordance with the second embodiment of the present invention.

The following descriptions will discuss another embodiment as the second embodiment of the present invention in reference to FIG. 2. For convenience in explanations, members having the same functions as the aforementioned embodiment will be designated by the same reference numerals, and thus the descriptions thereof shall be omitted here.

In the method of the first embodiment, although a compensation of the background can be improved compared with the conventional method, when removing the background using the gravitational center of the differential histogram as the threshold value for removing the background, the background may not be removed completely if the difference in density level between the background portion and non-background portion is not significant, or the density within the background portion or within the image portion is not uniform.

In an image processing apparatus of the second embodiment, as illustrated in FIG. 2, a background detecting section 11 is formed in replace of the background detecting section 6 of the first embodiment. In the background level detecting section 11, in order to store therein plural methods of computing plural threshold value, plural threshold value computing sections, for example, the first and the second threshold value computing sections 12 and 13 are formed.

The apparatus includes a selector 14 (comparison means, selection means) for selecting an output from either one of the threshold value computing section 12 or the threshold value computing section 13. The selector 14 receives a degree of separation and a difference in degree of separation from the degree of separation/difference in degree of separation computing section 9 compares the maximum value $\Delta\eta(T)_{MAX}$ with the set value C.

The respective threshold values computed in the first and second threshold value computing sections 12 and 13 are inputted to the selector 14. Then, based on the result of comparison, a threshold value for removing the background level is selected the one to be outputted between the two threshold values.

The background level detecting section 11 enables an optimal background level to be set as a threshold value with respect to the document 1 of various kinds. Based on the resulting threshold value, a background compensation is performed by outputting the digital image data wherein only the picture element data of the background in the digital image data inputted by the density converting section 7 is converted into the white picture element data.

As described, according to the arrangement of the second embodiment, a method of computing the threshold value for removing the background is set by comparing the maximum difference $\Delta\eta(T)_{MAX}$ with the set value C. As a result, the effect from the background with respect to the document 1 of various kinds can be eliminated.

As a conventional method of removing the background, a threshold value selecting method based-on the between-class dispersion difference is known. The method is presented by the inventors of the present invention (Taniquchi, et al.), by the Institute of Electronics, Information and Communication Engineers held in 1984 and 1985.

According to the described method, an increased amount $\Delta\eta(T)$ in degree of separation is computed based on the minimum density $k_{min}$ of the image based on the following formula. Then, using the density value k wherein $\Delta\eta(k)$ becomes lower than the average amount of increase $\Delta\eta_{AV}$ as a threshold value, the background is removed by converting only the picture element data having a density below a threshold value into the white image data.

$$\Delta\eta(k) = \eta(T+1) - \eta(T) \qquad (5)$$

$$\Delta\eta_{AV} = \sum_{T_{min}}^{A} \eta(T)/(Te - Tm + 1) \qquad (6)$$

The method enables a threshold value to be computed more precisely than the discriminating threshold value selecting method for use in a glass column as one of precipitation components in urine (cells, crystals, etc., in urine) as an example of the image in which the threshold value is difficult to be set as the difference in density level between the object and the background being insignificant.

The described method is effective in the pre-process of the recognizing process in the medical field, etc. However, when the method is applied to the method of removing the background when the user does not have the knowledge of the image processing such as a digital copying machine, etc., the user cannot select between the method suited for the image data and a more suited method for the image data.

However, according to the arrangement of the second embodiment, the method of computing the threshold value for removing the background level by comparing the maximum value $\Delta\eta(T)_{max}$ with the set value C is adopted. As a result, the effect from the background with respect to the document 1 of various kinds can be eliminated, thereby enabling automation.

[EMBODIMENT 3]

Figure 3:
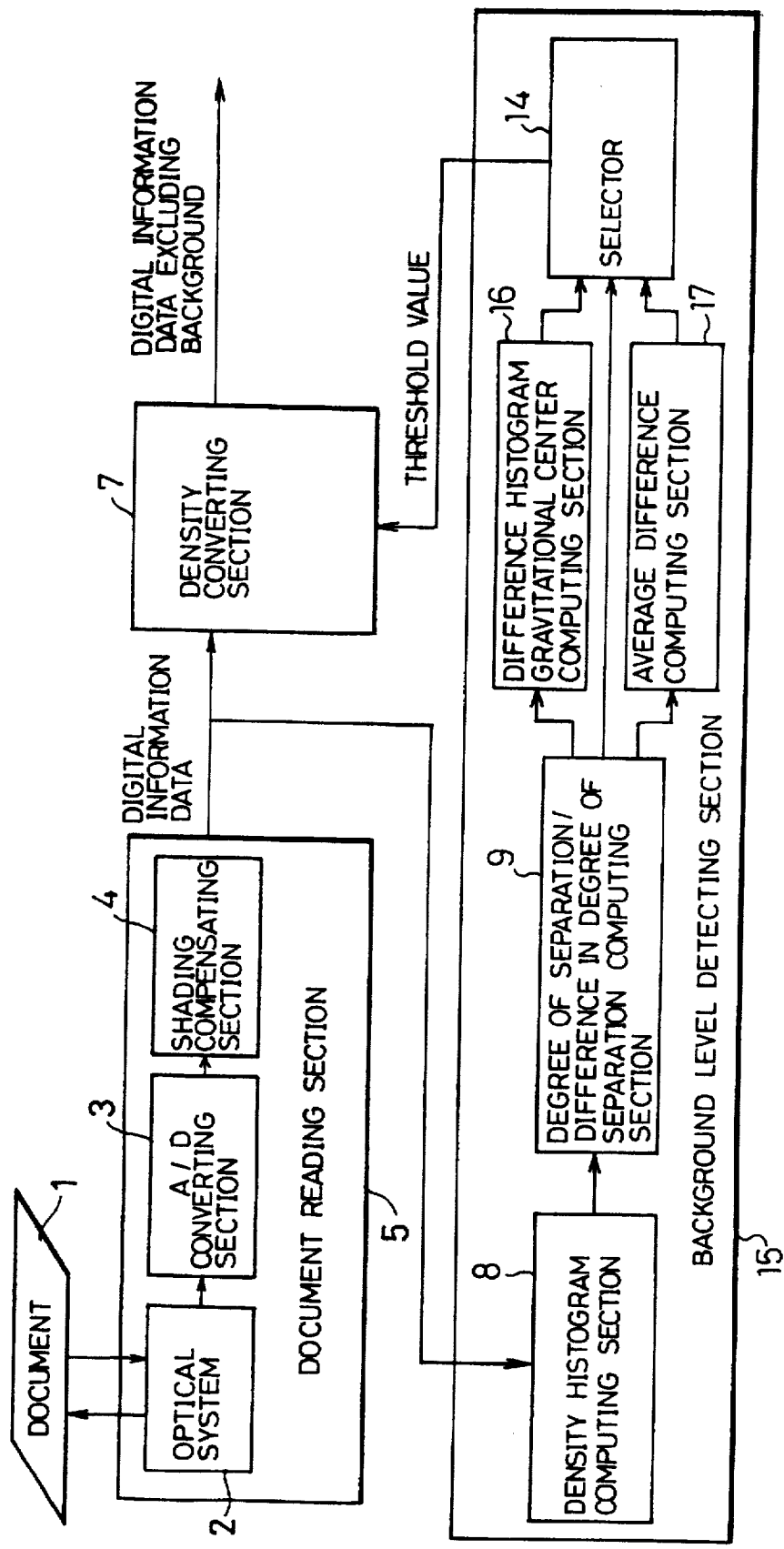
FIG. 3 is a block diagram showing the arrangement of an image processing apparatus in accordance with the third embodiment of the present invention.
Figure 4:
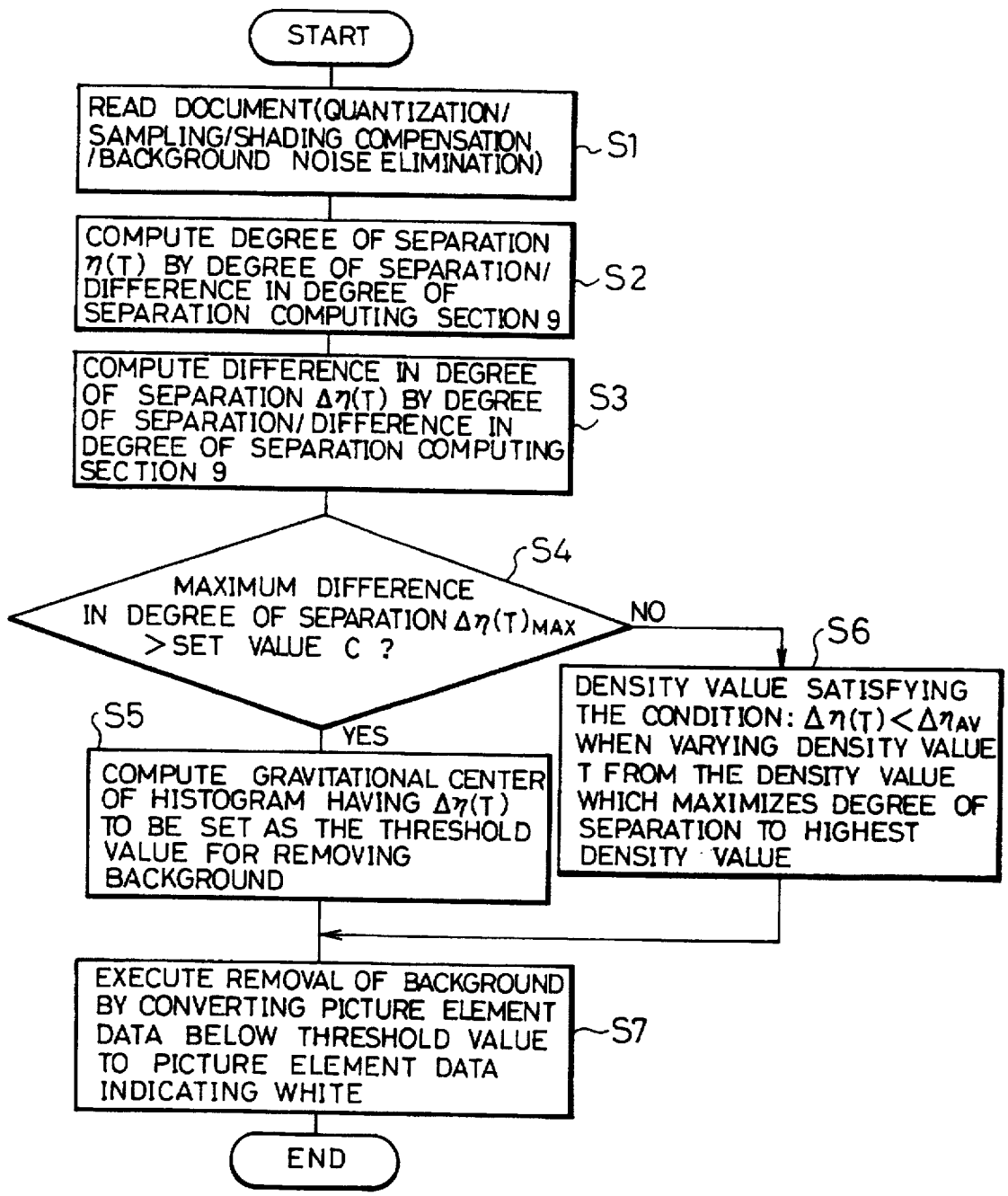
FIG. 4 is a flowchart showing operation processes in the image processing apparatus of FIG. 3.

The following descriptions will discuss still another embodiment of the present invention as the third embodiment in reference to FIGS. 3 and 4. For convenience in explanations, members having the same functions as the aforementioned first embodiment will be designated by the same reference numerals, and thus the descriptions thereof shall be omitted here.

As shown in FIG. 3, in an image processing apparatus of the third embodiment includes a background level detecting section 15 in replace of the background level detecting section 11 adopted in the second embedment. In the background level detecting section 15, in replace of the first threshold value computing section 12 and the second threshold value computing section 13 shown in FIG. 2, a differential histogram gravitational center computing section 16 and an average difference value computing section 17 for inputting therein outputs from the degree of separation/ degree of separation computing section 9.

The background level detecting section 15 includes the same selector 14 as that of the second embodiment for inputting therein output from the differential histogram gravitational center computing section 16 and the average differential value computing section 17. Then, the output from the selector 14 is inputted to the density converting section 7.

As shown in FIG. 4, in the image processing apparatus, the image read from the document 1 by the document reading section 5 is sampled and quantized. Then, a shading compensation and a noise compensation are applied to the image data, thereby obtaining digital image data (step 1, hereinafter referred to as step S). Then, the density histogram is computed by the density histogram computing section 8 based on the digital image data, and the degree of separation $\eta(T)$. Then, the change in degree of separation $\Delta\eta(T)$ is computed by the degree of separation/degree of separation computing section 9 based on the density histogram (S2 and S3).

Thereafter, the maximum difference $\Delta\eta(T)_{MAX}$ of the difference in degree of separation $\Delta\eta(T)$ is compared with the set value C (S4). As a result of comparison, if $\Delta\eta(T)_{MAX} > C$ based on the difference in degree of separation $\Delta\eta(T)$, the density T which shows the gravitational center of the differential histogram is computed by the differential histogram gravitational center computing section 16 (S5). Here, the value C is an experimentally set statistical value.

On the other hand, if $\Delta\eta(T)_{MAX} \leq C$ in S4, it is difficult to separate the background from the object. Namely, it is determined as an area from which a removal of the background is difficult merely by setting the threshold value for removing the background based on the gravitational center of $\Delta\eta(T)$. Therefore, after computing the average difference value $\Delta\eta_{AV}$ by the average difference computing section 17, the density value T is gradually decremented from Tm which gives the maximum degree of separation is set as the threshold value for removing the background (S6).

The threshold value thus selected is inputted to the density converting section 7. Then, the density converting section 7 outputs the data indicating rightness in each picture element of the digital image data to be inputted based on the threshold value in such a manner that if the brightness exceeds the threshold value, the data is converted into the image data indicating white before being outputted, while if the brightness is not more than the threshold value, the image data is outputted without being processed, thereby removing removal of the background (S7).

In the described preferred embodiments, even in the case where the background is not uniform or the density of the non-background portion is not uniform and the removal of the background is difficult, i.e., the case where a large background noise is generated, and the removal of only the background without removing the image portion (object) is difficult, the background can be removed completely.

In the described preferred embodiment, an example has been given through the case where the density converting section outputs the density of each picture element in a form of many valued image data. However, in replace of the density converting section 7, for example, like a facsimile, a binary converting section 18 (see FIG. 5) may be provided for outputting the data indicating the brightness of each picture element in the digital image data in a form of a digital data.

In the binary converting section 18, based on the inputted threshold value, the brightness of each picture element of the inputted digital image data is set to "0" indicating white if the brightness is below the threshold value and set to "1" indicating black if the brightness is above the threshold value. As a result, as in the case of the described preferred embodiments, the image quality of the digital image data outputted from the binary converting section 18 can be improved.

Figure 5:
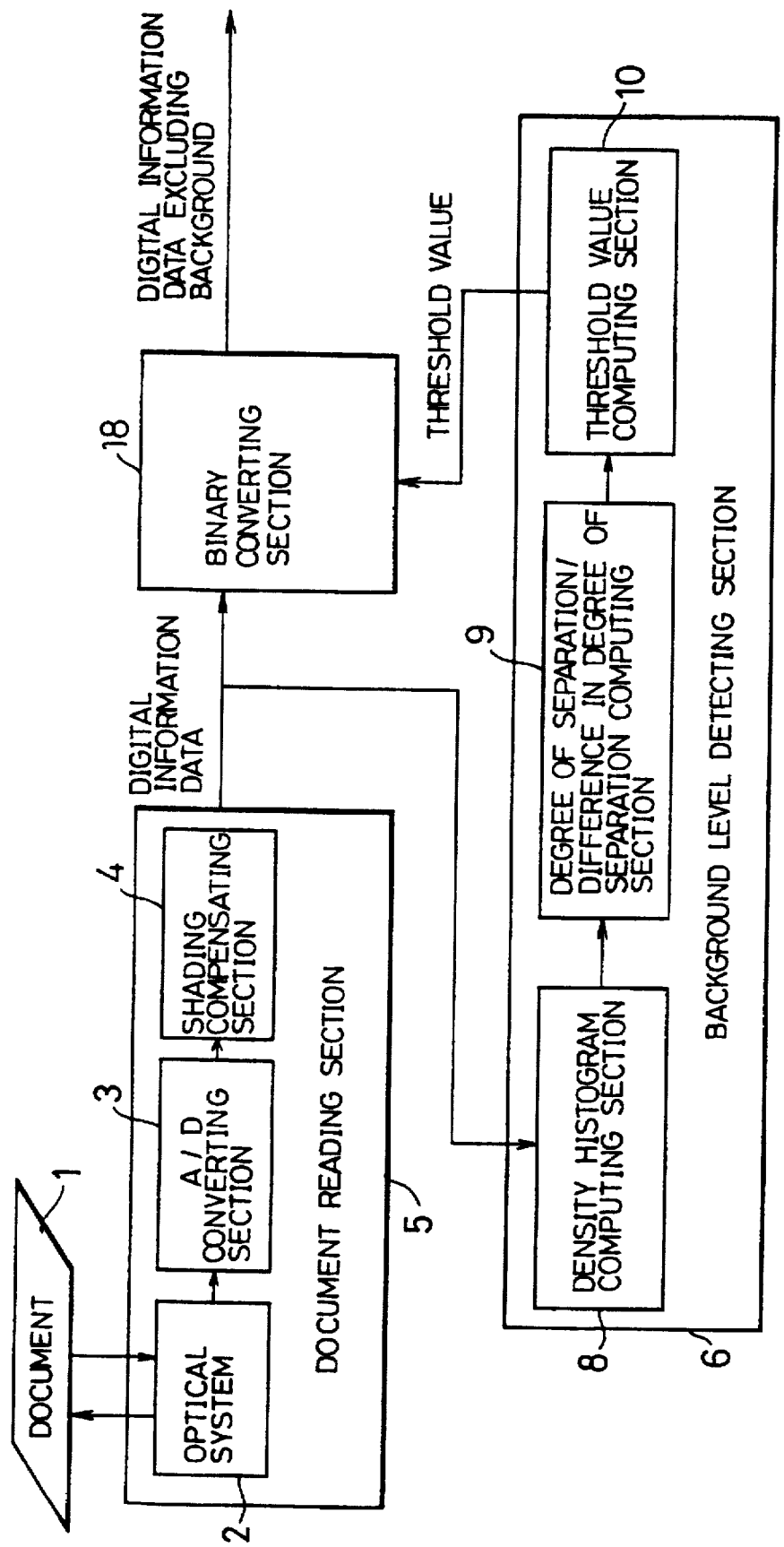
FIG. 5 is a block diagram showing a configuration of an image processing apparatus when the configuration of the first embodiment is applied for binarization.
Figure 6:
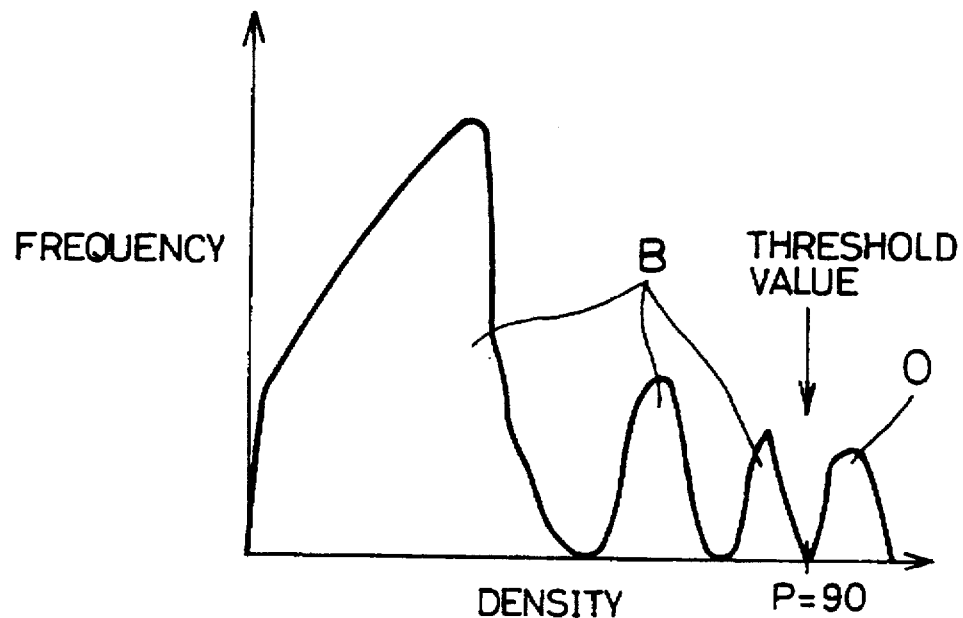
FIG. 6 is a graph showing a P-tile method as a conventional image processing method.
Figure 7:
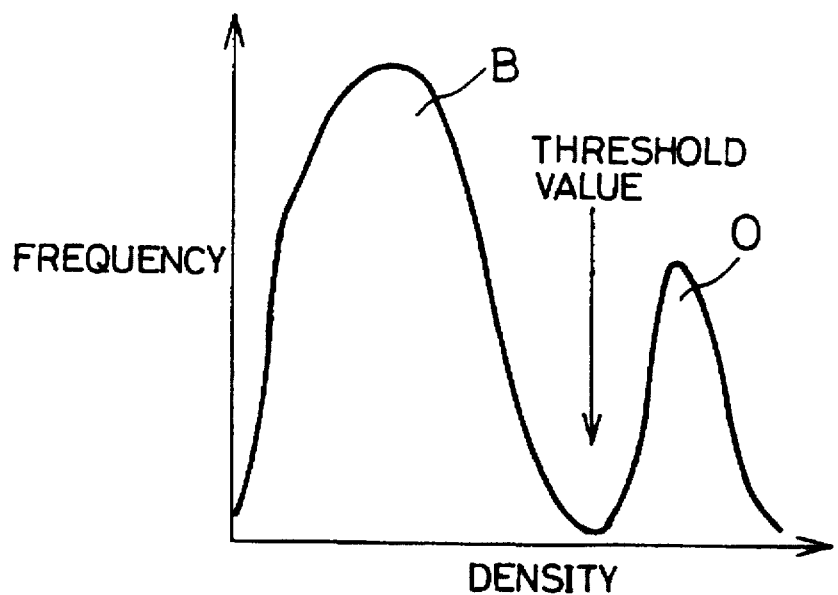
FIG. 7 is a graph showing a mode method as a conventional image processing method.
Figure 8:
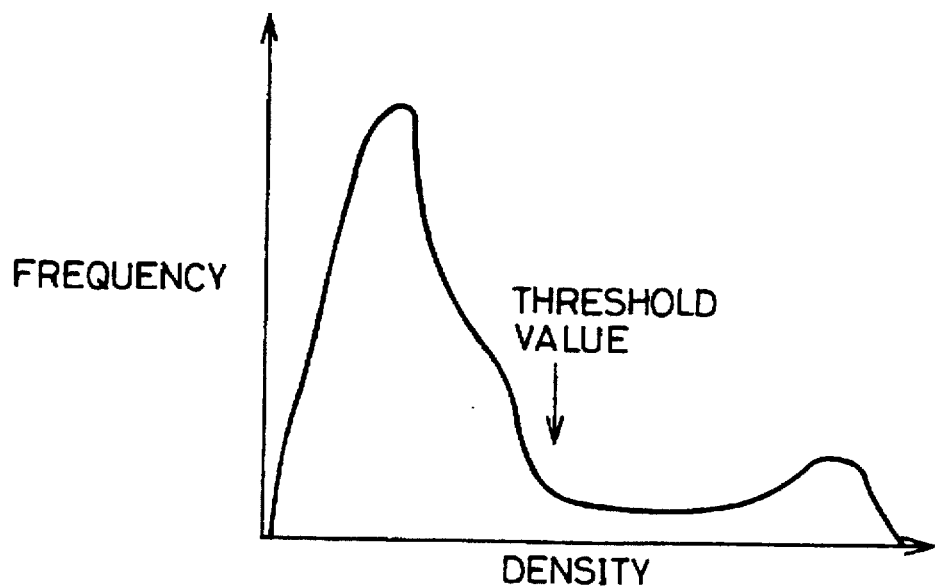
FIG. 8 is a graph explaining a discriminating threshold value selecting method as a conventional image processing method.
Figure 9:
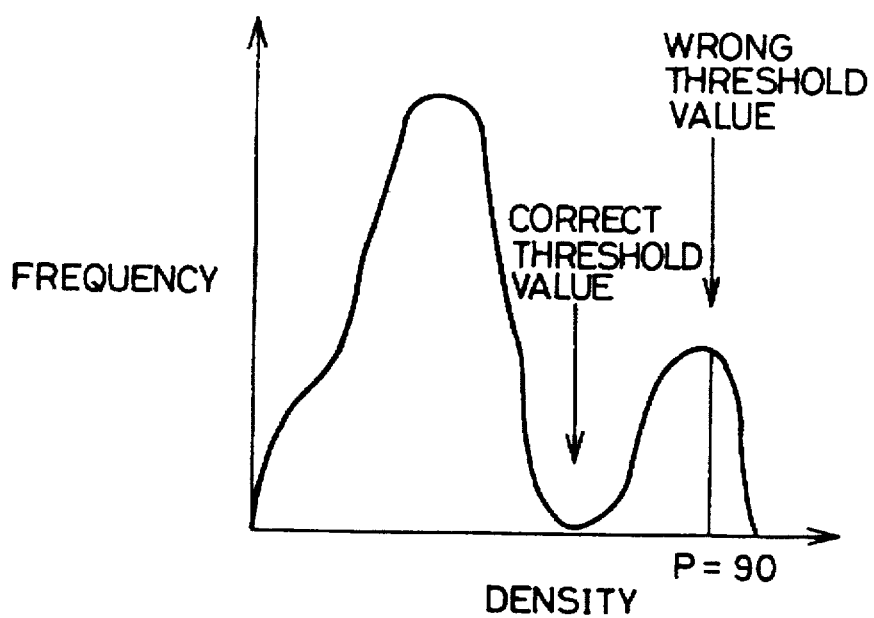
FIG. 9 is a graph explaining a wrong use of the P-tile method as an image processing method.
Figure 10:
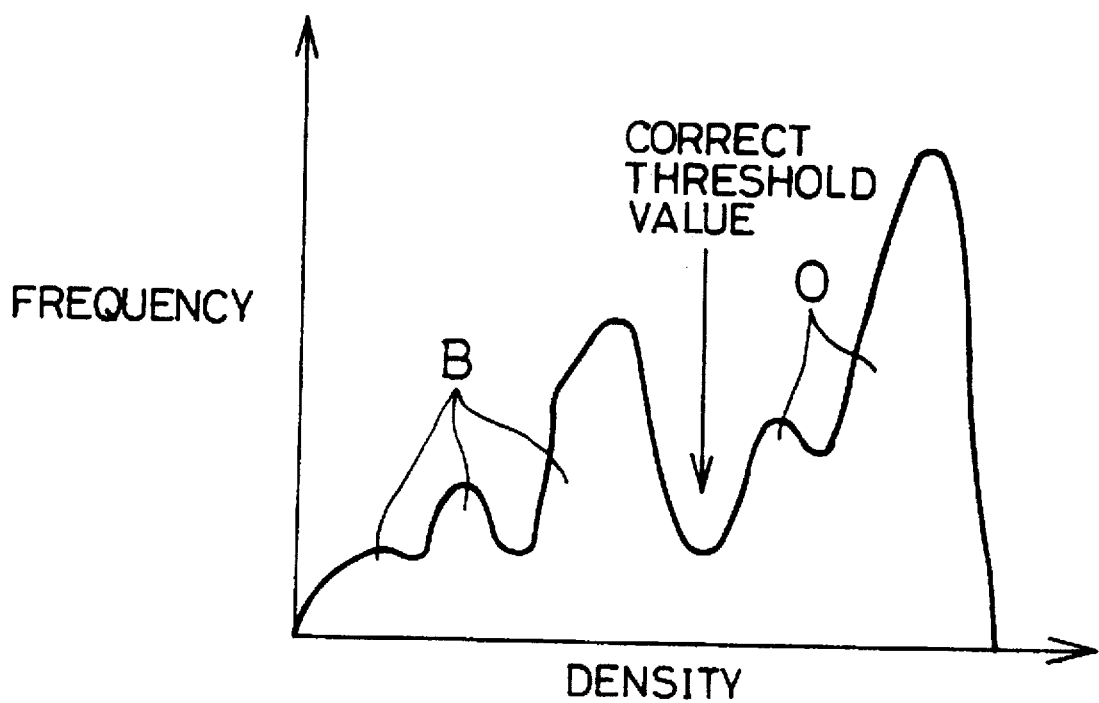
FIG. 10 is a graph showing a density histogram having image data which cannot be processed by any conventional methods.

The arrangement which is the same as the first embodiment except that the binary converting section 18 is used in replace of the density converting section 7 is shown in FIG. 5. Although not shown, the binary converting section 18 may be used in replace of the density converting section 7 adopted in the second embodiment. Furthermore, in the arrangement of the third embodiment, the binary converting section 18 (not shown) may be used in replace of the density converting section 7.

The respective arrangements adopting the binary converting section 18 enable the image data to be binarized even with respect to the image data which are difficult to be binarized by the conventional methods, such as the case where the difference in density level between the background and the object is not significant, or the high density portion and the low density portion are mixed in one object.

Furthermore, in each embodiment, explanations have been given through the case where the entire threshold value processing. However, by executing a partial threshold value processing, the process such as pre-scanning, etc., can be omitted. It is not necessarily that the image data to be processed in the present invention is the image data read from the document 1. For example, when the present invention is applied to cameras, videos, etc., it is needless to say that a scenery behind corresponds to the background to be removed.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:
   detection means for detecting a threshold density value based on image data, composed of plural picture element data obtained by digitizing a density value of each picture element of an image; and
   density conversion means for outputting the image data obtained by converting the density value of the picture element data whose density value is not more than the threshold density value into a predetermined value, so as to reduce effects of background on the image,
   wherein said detection means prepares a density histogram composed of the density values and frequencies of respective picture elements based on the image data,
   said detection means divides the density histogram into a pair of classes by each of boundary density values at predetermined intervals, and
   said detection means computes a degree of separation of each boundary density value which is a ratio of a within-class dispersion to a between-class dispersion in each pair of classes, and computes the threshold density value based on respective increments of degree of separation at the boundary density values whose density values are in a range from Tm which maximizes the degree of separation to a highest density Te.

2. The image processing apparatus as set forth in claim 1, wherein:
   said detection means computes a boundary density value in a vicinity of a boundary density value corresponding to a minimum increment in degree of separation as a threshold value.

3. The image processing apparatus as set further in claim 1, wherein:
   said detection means computes a boundary density value which is smaller than a density value corresponding to a minimum increment in degree of separation as a threshold value.

4. The image processing apparatus set forth in claim 1, wherein:
   said detection means computes a boundary density value which is a gravitational center of a differential histogram showing a respective differential values as a threshold value.

5. The image processing apparatus as set forth in claim 1, wherein:
   said density converting means binaries each picture element data of the image data based on the threshold value.

6. The image processing apparatus as set forth in claim 1, wherein:
   said predetermined value is a density value indicative of white.

7. An image processing apparatus, comprising:
   detection means for detecting a threshold density value based on image data composed of plural picture element data obtained by digitizing a density value of each picture element of an image; and
   density conversion means for outputting the image data obtained by converting the density value of the picture element data whose density value is not more than the threshold density value, into a predetermined value, so as to reduce effects of background on the image,
   comparison means for determining a maximum difference value and comparing the maximum difference value with a set value based on a signal from said detection means; and
   selection means having stored therein plural methods of computing the threshold density value, for selecting one of the plural methods of computing the threshold density value based on a signal from said comparison means indicating whether the set value is greater than the maximum difference value or smaller,
   wherein said detection means prepares a density histogram composed of the density values and frequencies of respective picture elements based on the image data,
   said selection means divides the density histogram into a pair of classes by each of boundary density values at predetermined intervals,
   said detection means computes a degree of separation of each boundary density value which is a ratio of a within-class dispersion to a between-class dispersion in each pair of classes, and computes the threshold density value based on respective increments of degree of separation at the boundary density values whose density values are in a range from a density Tm which maximizes the degree of separation to a highest density Te,
   said detection means computes a density value corresponding to a gravitational center of a histogram in each difference value as the threshold density value based on a signal from said selection means if the maximum difference value exceeds the set value, and
   said detection means computes a difference in density value as the threshold density value when each difference value is below an average when computing respective difference in degree of separation in a range from the density Tm which maximizes the degree of separation to the highest density Te if the maximum difference value does not exceed the set value.

8. A method for processing an image in an image processing apparatus, comprising the steps of:
   computing a density histogram based on image data composed of plural picture element (pixel) data obtained by digitizing a density value of each picture element of the image, said density histogram composed of a density value in each pixel data and a frequency of appearance of each said density value in said image data;

computing a degree of separation of each boundary density value by dividing the density histogram into two classes by each of boundary density values at predetermined intervals, said degree of separation of each boundary density value providing a ratio of between-class dispersion to in-class dispersion in each of said classes;

computing a threshold density value based on an increment of the degree of separation of each boundary density value in a range from a boundary density value Tm to a maximum density Te which maximizes a degree of separation; and converting density for outputting the image data by converting the density value of the picture element data that is not more than the threshold density value into a predetermined value so as to reduce effects of background on the image.

* * * * *